United States Patent
Lee

(10) Patent No.: US 7,415,067 B2
(45) Date of Patent: Aug. 19, 2008

(54) FIXED DELAY TREE SEARCH/DECISION FEEDBACK EQUALIZER USING ABSOLUTE VALUE CALCULATION AND DATA RESTORING METHOD USING THE SAME

(75) Inventor: Jong Han Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1205 days.

(21) Appl. No.: 10/052,411

(22) Filed: Jan. 23, 2002

(65) Prior Publication Data

US 2002/0146070 A1    Oct. 10, 2002

(30) Foreign Application Priority Data

Feb. 27, 2001 (KR) .................. 2001-10068

(51) Int. Cl.
*H03H 7/30* (2006.01)
(52) U.S. Cl. ..................... 375/233; 375/229
(58) Field of Classification Search ................. 375/229, 375/232, 233, 234
See application file for complete search history.

(56) References Cited

U.S. PATENT DOCUMENTS

| | | | | |
|---|---|---|---|---|
| 3,715,670 A * | 2/1973 | Hirsch et al. | ................. | 375/232 |
| 4,271,525 A * | 6/1981 | Watanabe | ................... | 375/232 |
| 4,870,657 A * | 9/1989 | Bergmans et al. | ............ | 375/233 |
| 5,155,742 A * | 10/1992 | Ariyavisitakul et al. | ..... | 375/231 |
| 5,291,523 A * | 3/1994 | Bergmans et al. | ............ | 375/232 |
| 5,398,259 A * | 3/1995 | Tsujimoto | .................... | 375/233 |
| 5,517,527 A * | 5/1996 | Yu | .............. | 375/233 |
| 5,757,855 A * | 5/1998 | Strolle et al. | ................. | 375/262 |
| 5,822,143 A * | 10/1998 | Cloke et al. | .................... | 360/65 |
| 6,038,269 A * | 3/2000 | Raghavan | ................... | 375/340 |
| 6,088,404 A * | 7/2000 | Jekal | ......................... | 375/341 |
| 6,201,832 B1* | 3/2001 | Choi | ......................... | 375/233 |
| 6,356,586 B1* | 3/2002 | Krishnamoorthy et al. | .. | 375/233 |
| 6,535,553 B1* | 3/2003 | Limberg et al. | ............. | 375/232 |
| 6,553,085 B1* | 4/2003 | Trans | ........................ | 375/346 |
| 6,690,723 B1* | 2/2004 | Gosse et al. | ................. | 375/233 |
| 6,760,372 B1* | 7/2004 | Zortea et al. | ................. | 375/232 |
| 6,798,832 B1* | 9/2004 | Nakata et al. | ................ | 375/233 |
| 6,870,882 B1* | 3/2005 | Al-Dhahir et al. | ........... | 375/233 |
| 7,050,419 B2* | 5/2006 | Azenkot et al. | ............. | 370/347 |
| 2002/0094043 A1* | 7/2002 | Chu et al. | .................... | 375/346 |

* cited by examiner

*Primary Examiner*—Emmanuel Bayard
(74) *Attorney, Agent, or Firm*—Birch, Stewart, Kolasch & Birch, LLP

(57) ABSTRACT

An FDTS/DF equalizer using absolute value calculation includes: a feed-forward filter receiving and filtering a sampled signal; a feed-back filter filtering a restored data; a subtractor obtaining a difference between signals respectively filtered by the feed-forward filter and the feed-back filter; and a detector receiving the subtracted signal and detecting a data using absolute value calculation. The FDTS/DF equalizer in the reproducing terminal which reproduces a data passing through a channel performs an absolute value operation by using the adder, so that the number of gates can be reduced, the calculation speed can be improved, and the size of a chip can be reduced.

13 Claims, 6 Drawing Sheets

FIG. 6

| TAU=2 | | CELL AREA | CRITICAL PATH |
|---|---|---|---|
| FDTS | ABSOLUTE VALUE | 480 | 60.30ns |
| | MULTIPLY | 2195 | 81.19ns |

FIXED DELAY TREE SEARCH/DECISION FEEDBACK EQUALIZER USING ABSOLUTE VALUE CALCULATION AND DATA RESTORING METHOD USING THE SAME

BACKGROUND OF THE INVENTION

1. Field of the Invention

The present invention relates to an equalizer of a digital optical disk recording/reproducing system, and more particularly, to a fixed delay tree search/decision feedback equalizer using an absolute value calculation in a reproducing terminal which reproduces a data passing through a channel and a data restoring method using the same.

2. Description of the Background Art

Recently, as a recording density of a recording medium of an optical recording/reproducing system increases, an intersymbol interference is increased between recording data. Thus, a technique allowing a reading terminal of the recording/reproducing system to accurately restore a data is required.

FIG. 1 is a schematic block diagram showing the construction of a general digital optical recording/reproducing system.

As shown in FIG. 1, a data recording terminal 100 of the digital optical recording/reproducing system includes an A/D converter 110 sampling an image/audio signal to digital data; a coding unit 120 for coding the image/audio signal; a recording waveform generating unit 130 generating a recording waveform according to a characteristic of an optical recording medium; a laser disc (LD) drive unit 140 driving an optical diode corresponding to the recording waveform, and a phase lock loop (PLL) 150 for synchronizing in recording a data.

A data reading terminal 200 of the digital optical recording/reproducing system includes: a radio frequency amplifying unit 210 reading and amplifying a data stored in the optical recording medium; an automatic gain controller 220 controlling a gain of the radio frequency amplified signal; a synchronizing unit 240 compensating a time delay; an A/D converter 230 sampling the gain controlled signal to digital data; an equalizer 250 restoring the sampled digital data; a decoding unit 260 removing a noise generated to the restored digital data and detecting and correcting an error for channel transmission; and a D/A converter 270 restoring the decoded digital data to its original image/audio signal.

The operation of the digital optical recording/reproducing system constructed as described above will now be explained.

First, the A/D converter 110 samples an inputted image/audio signal and converts the signal into a digital data.

Then, the coding unit 120 codes the digital data in order to minimize an error or a noise in transmission of the digital data through channel.

Then, the recording waveform generating unit 130 generates a waveform for being recorded in a storing medium according to the coded digital signal, and the LD drive unit 140 records a signal corresponding to the waveform in the storing medium 160.

The radio frequency amplifying unit 210 amplifies the signal detected from the storing medium 160, and the automatic gain controller 220 controls the gain of the amplified signal to a certain level.

Then, the A/D converter 230 samples the gain-controlled signal to digital data, and the equalizer 250 restores the sampled signal as a data.

At this time, the synchronizing unit 240 synchronizes the equalizer 250 and the A/D converter 230 in order to prevent occurrence of a time delay in sampling and data restoring.

Thereafter, the decoding unit 260 removes a noise of the data generated in transmitting it through a channel, detects and corrects an error, and then, the D/A converter 270 restores an original image/audio signal.

At this time, in order to restore an accurate data, the equalizer 250 of the reproducing terminal 200 generally uses a decoding algorithm of a maximum likelihood sequence detection (MLSD) method.

However, the MLSD method is implemented on the basis of a means square error (MSE) in which a minimum distance is computed by the square of an error between the signal inputted to the equalizer 250 and a reference signal and a decoding is performed according to a path metric that accumulates the computed minimum distances.

However, a multiplier used for the minimum distance computation exposes the following problems.

That is, in a high density digital video disc (DVD) system of 15 GB (giga byte) level, a calculation speed of a higher speed is requested, and if it is substantially implemented as an application-specific integrated circuit (ASIC), the computation amount is increased, so that a calculation speed is slow. And since many gates are used, a chip is enlarged in size.

In addition, in order to improve the speed in operating the minimum distance using the MLSD method, if a different calculation method (i.e., an absolute value calculation) is used, a performance is rather degraded.

SUMMARY OF THE INVENTION

Therefore, an object of the present invention is to provide an FDTS/DF (Fixed-Delay Tree Search with Decision Feedback equalizer using an absolute value calculation that is capable of reducing the number of gates, improve a calculation speed and reducing the size of a chip.

To achieve these and other advantages and in accordance with the purpose of the present invention, as embodied and broadly described herein, there is provided an FDTS/DF equalizer using absolute value calculation includes: a feed-forward filter receiving and filtering a sampled signal; a feed-back filter filtering a restored data; a subtractor obtaining a difference between signals respectively filtered by the feed-forward filter and the feed-back filter; and a detector receiving the subtracted signal and detecting a data using absolute value calculation.

To achieve the above object, there is also provided a data restoring method of an FDTS/DF equalizer using absolute value calculation including the steps of: obtaining a difference between signals respectively filtered by a feed-forward filter and a feed-back filter; computing an error through absolute value calculation between the signal difference and a reference signal; delaying the error as deep as τ and adding them; storing the added results; obtaining a minimum value of the stored error values and obtaining a path according to the minimum value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a graph comparatively showing a result when the FDTS/DF equalizer is implemented as an ASIC in accordance with the preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
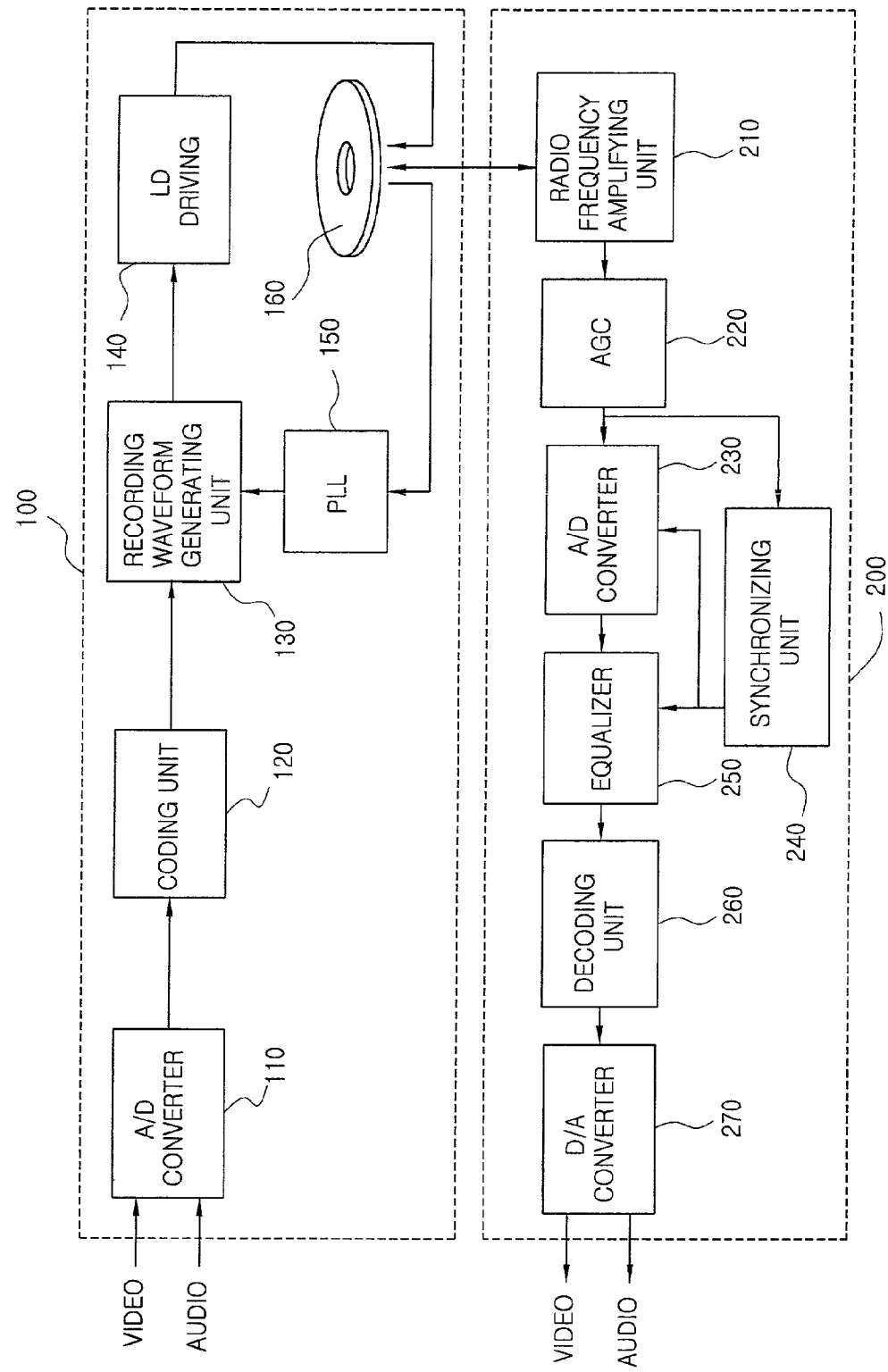
FIG. 1 is a schematic block diagram showing the construction of a general digital optical recording/reproducing system.
Figure 2:
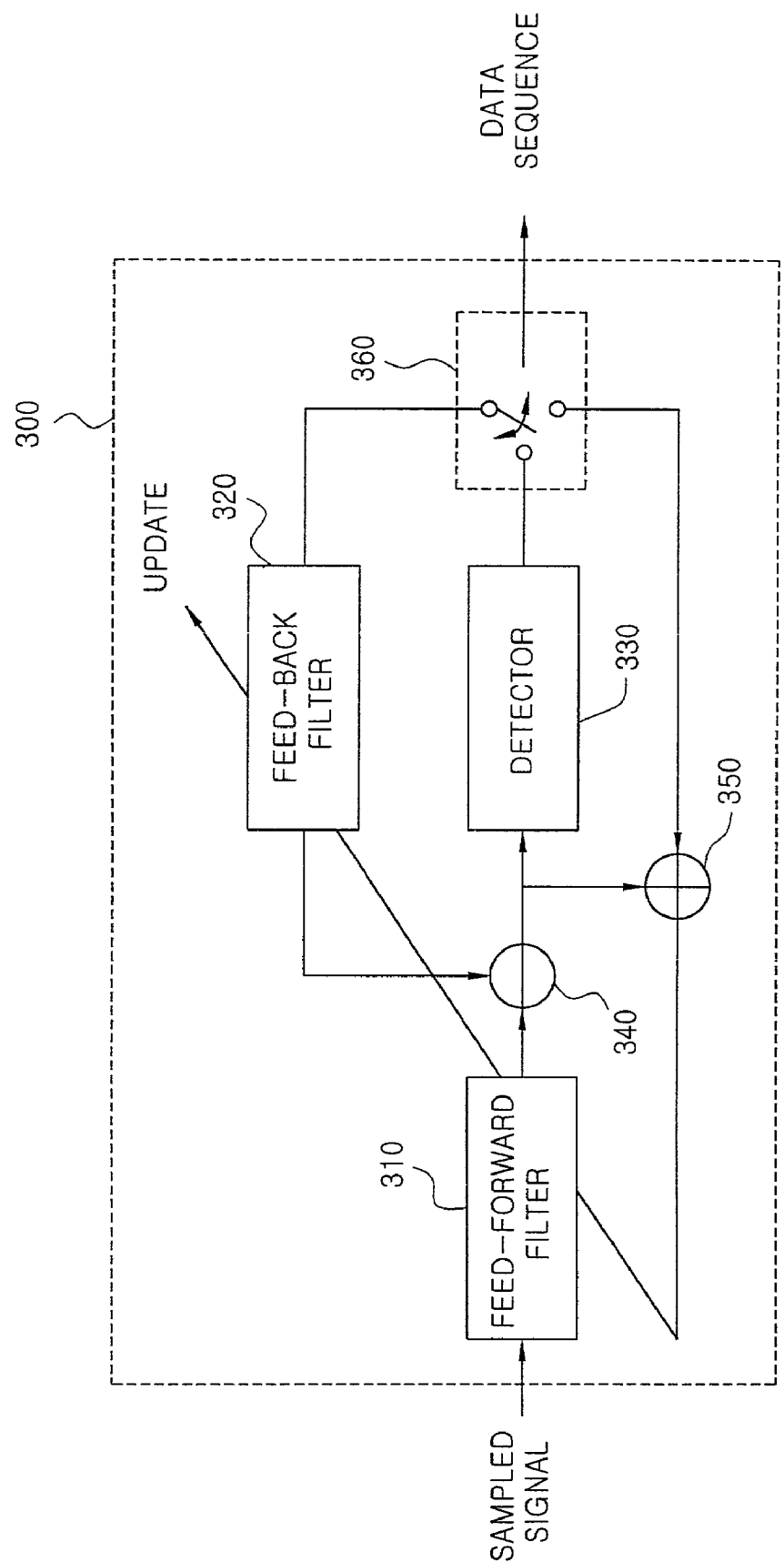
FIG. 2 is a schematic block diagram showing the construction of an FDTS/DF equalizer in accordance with a preferred embodiment of the present invention.

FIG. 2 is a schematic block diagram showing the construction of an FDTS/DF equalizer in accordance with a preferred embodiment of the present invention.

As shown in FIG. 2, an FDTS/DF equalizer 300 includes a feed-forward filter 310 filtering a signal sampled in an A/D converter; a feed-back filter 320 filtering a restored data; a subtractor 340 obtaining a difference between signals respectively filtered by the feed-forward filter 310 and the feed-back filter 320; a detector 330 receiving the subtracted signal and detecting the restored data according to an FDTS algorithm; and a switching unit 360 performing a training for a predetermined time to initialize the feed-forward filter 310, the feed-back filter 320 and the detector 340, and controlling a coefficient of each filter.

A reference numeral 350 is an adder.

The feed-forward filter 310 makes the signal sampled by the A/D converter 230 to a causal signal. Then, an intersymbol interference of the causal signal is removed by the feed-back filter 320 and inputted to the detector 330.

That is, when the sampled signal is inputted to the feed-forward filter 310, the difference between the feed-forward filtered signal and the feed-back filtered signal is inputted to the detector 330 (at this time, the output of the feed-back filter 320 is a value calculated with the output of the detector 330 outputted prior to one sampling time), and the output signal of the detector 330 is inputted to the feed-back filter 320. Thereafter, the final output of the detector 330 is restored as a data.

Figure 3:
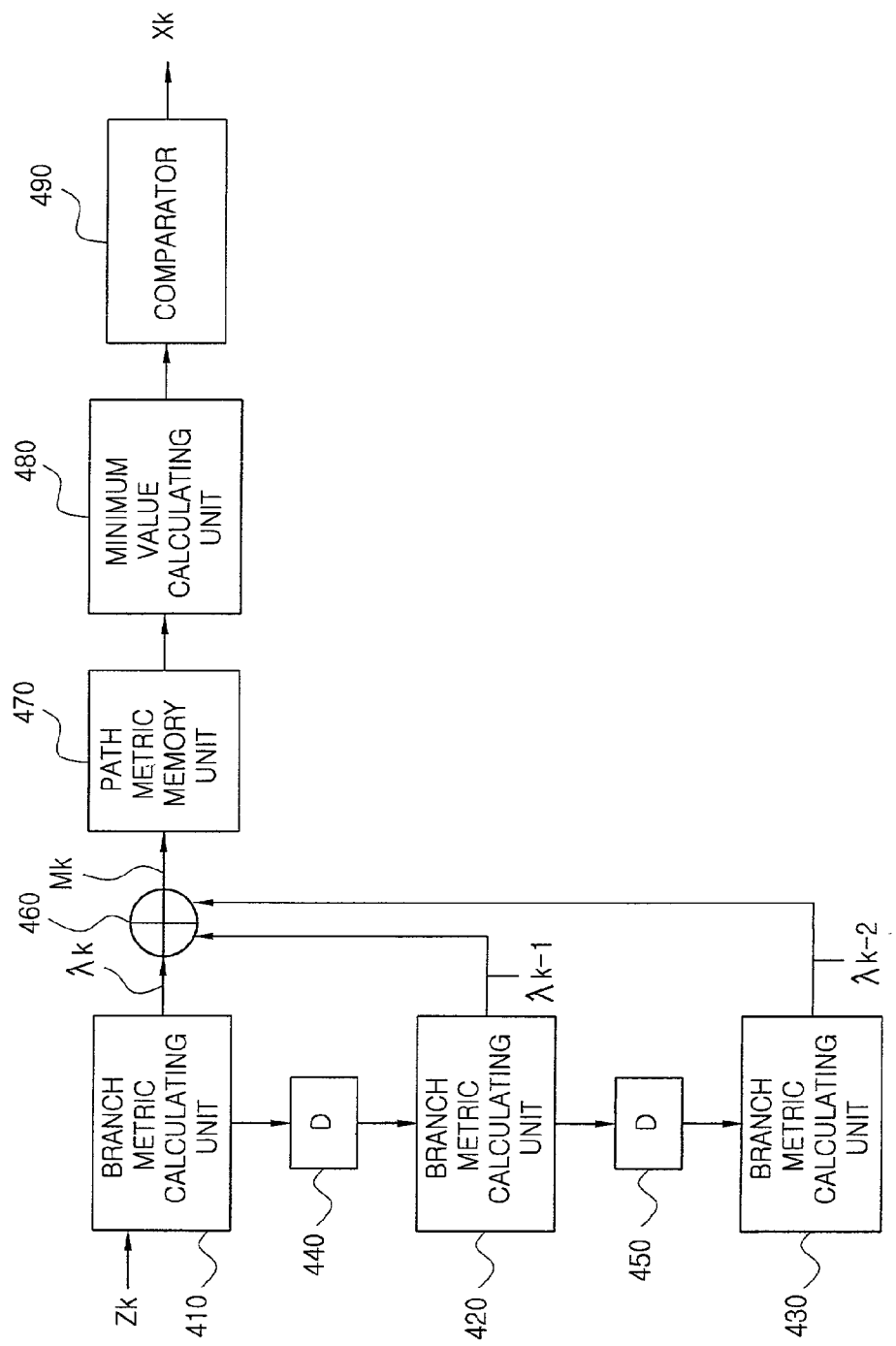
FIG. 3 is a schematic block diagram showing the construction of a detector when τ=2 of FIG. 2 in accordance with the preferred embodiment of the present invention.

FIG. 3 is a schematic block diagram showing the construction of a detector when τ=2 of FIG. 2 in accordance with the preferred embodiment of the present invention.

As shown in FIG. 3, the detector 330 includes branch metric calculating units 410, 420 and 430 obtaining an error between a signal subtracted by the subtractor 340 and a reference signal; an adding unit 460 delaying values calculated by the branch metric calculating units 410, 420 and 430 as deep as τ and adding them; a path metric memory unit 470 storing the added value; a minimum value calculating unit 480 computing a minimum value of the stored value; and a comparator 490 comparing the minimum values and outputting the smallest value.

Reference numerals 440 and 450 denote delay units.

Figure 4:
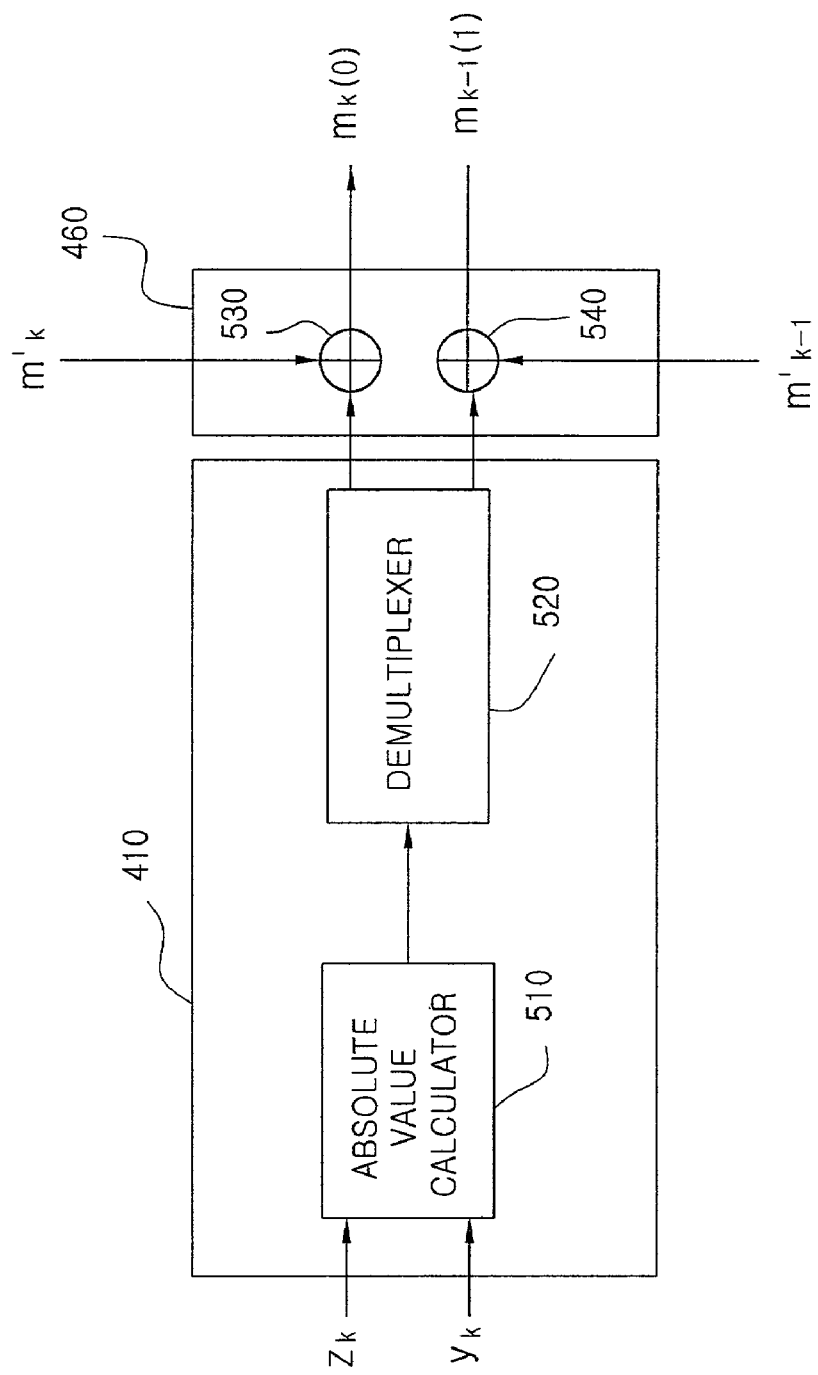
FIG. 4 is a schematic block diagram showing the construction of a branch metric calculating unit of FIG. 3 in accordance with the preferred embodiment of the present invention.

FIG. 4 is a schematic block diagram showing the construction of a branch metric calculating unit of FIG. 3 in accordance with the preferred embodiment of the present invention.

As shown in FIG. 4, the branch metric calculating units 410, 420 and 430 respectively include an absolute value calculator 510 obtaining an absolute value of a difference between the signal subtracted by the subtractor 340 and the reference signal, and a demultiplexer 520 demultiplexing a signal outputted from the absolute value calculator 510.

The adding unit 460 includes adders 530 and 540 respectively adding the value outputted from the demultiplexer 520 and the path metric prior to the one period of sampling times.

The FDTS/DF equalizer constructed as described above will now be explained with reference to FIGS. 2 through 4.

The FDTS/DF equalizer 300 uses a recursive branch searching algorithm having a finite depth. After leaving a portion of the intersymbol interference (ISI) appearing in the output of the equalizer 300, the FDTS/DF equalizer 300 performs an MLSD having a limited depth by using the branch searching algorithm.

In addition, the FDTS/DF equalizer 300 delays determination of a recording signal value as deep as τ, accumulates the square of the error of each node of a searching tree in the branch metric calculating unit 410, selects a path having the minimum value, and estimates an original data $X_{k-\tau}$.

That is, if a determination delay value is τ, an output value (Zk) of the equalizer 300 is given by the below equation (1):

$$Z_k = g_k - \sum_{i=\tau-1}^{L} W^b(i)\hat{x}_{k-i} \qquad (1)$$

wherein $g_k$ indicates an output value passing the feed-forward filter 310, $W^b$ indicates a coefficient of the feed-back filter 320, and 'L' indicates the number of taps of each of filters 310 and 320. At this time, the accumulated path metrics and the branch metrics are represented by the below equations (2) and (3).

$$m_k = \sum_{i=0}^{\tau} (Z_{k-i} - y_{k-i})^2, \qquad (2)$$

$$\lambda_k = (Z_k - y_k)^2 \qquad (3)$$

wherein $y_k$ indicates a target sequence or a reference signal and given by the below equation (4).

$$y_k = \sum_{i=0}^{\tau} W^b(i)x_{k-i} \qquad (4)$$

Accordingly, equation (3) can be represented by below equation (5).

$$\lambda_k = \left(Z_k - \sum_{i=0}^{\tau} W^b(i)x_{k-i}\right)^2 = \left(g_k - \sum_{i=\tau-1}^{L} W^b(i)\hat{x}_{k-i} - \sum_{i=0}^{\tau} W^b(i)x_{k-i}\right)^2 \qquad (5)$$

Thereafter, the minimum value calculating unit 480 obtains the minimum values of the path metrics accumulated in the path metric memory unit 470 and accumulates them, and the comparator 490 compares the minimum values and obtains the most minimum value.

And only the branch metric according to the minimum value is left while discarding other remaining branch metrics. Then, only half the existing branch metrics are left. This sequence is repeated and a path which is finally left is the path-restored data $x_{k-r}$.

In this manner, the calculation amount of the FDTS/DF detecting method is linearly increased, unlike the MLSD method in which the calculation amount is increased index-functionally according to the length of the intersymbol interference.

Accordingly, the FDTS/DF equalizing method adopting the MLSD of a finite length to the determination node has an excellent performance with less computation amount.

In addition, the detector 330 is constructed by using an absolute value in order to remove the multiplier which occupies much space in the chip. The path metric and branch metric accumulated at this time is expressed in below equation (7).

$$m_k = \sum_{i=0}^{i=\tau} |Z_{k-i} - y_{k-i}|, \qquad (6)$$

$$\lambda_k = |Z_k - y_k| \qquad (7)$$

The branch metric calculating units 410, 420 and 430 adding unit 460 is implemented by adopting the equations (6) and (7).

Figure 5:
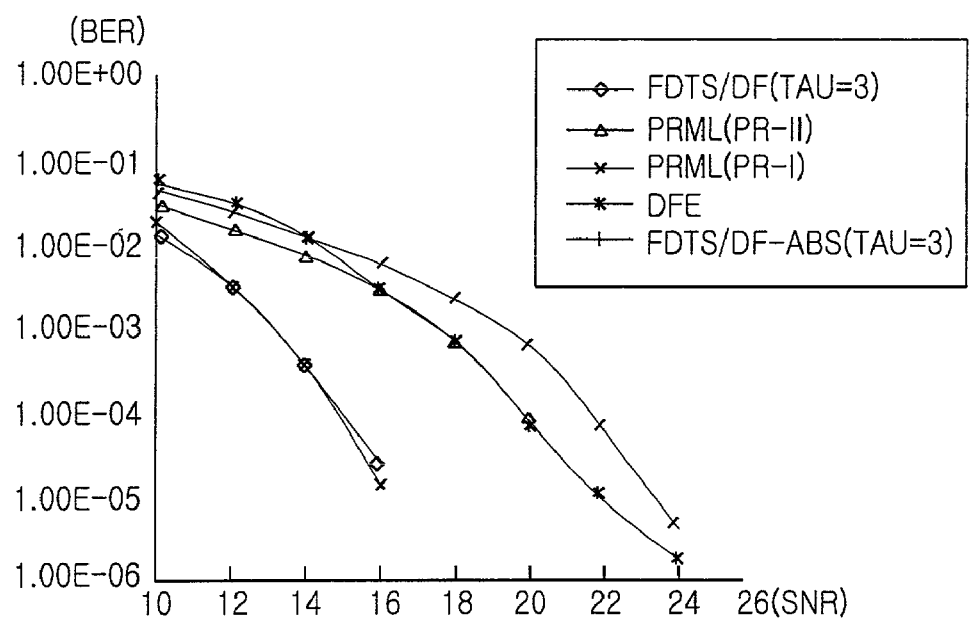
FIG. 5 is a graph showing a mock experiment result in accordance with the preferred embodiment of the present invention.

FIG. 5 is a graph showing a mock experiment result in accordance with the preferred embodiment of the present invention.

As shown in FIG. 5, it is noted that the more a signal-to-noise ratio is increased, the less a bit error rate is reduced, resulting in that the performance is improved, and also that there is no difference between the characteristics of the performance of the FDTS/DF equalizer constructed by using the multiplier and the FDTS/DF equalizer constructed by using an absolute value.

FIG. 6 is a graph comparatively showing a result when the FDTS/DF equalizer is implemented as an ASIC in accordance with the preferred embodiment of the present invention.

As shown in FIG. 6, since the critical path time of the FDTS using an absolute calculation is shorter than that of the FDTS using a multiplier, the operation speed is fast and a cell area representing the size of a chip is reduced.

As so far described, the FDTS/DF equalizer in the reproducing terminal which reproduces a data passing through a channel performs an absolute value operation by using the adder, so that the number of gates can be reduced, the calculation speed can be improved, and the size of a chip can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A Fixed-Delay Tree Search with Decision Feedback (FDTS/DF) equalizer, comprising:
 a feed-forward filter receiving and filtering a sampled signal;
 a feed-back filter filtering a restored data;
 a subtractor subtracting signals respectively filtered by the feed-forward filter and the feed-back filter; and
 a detector receiving the subtracted signal and detecting a data using an absolute value calculation,
 wherein the detector comprises:
  a plurality of branch metric calculating units obtaining an error between the subtracted signal and a reference signal, wherein the reference signal is time-variant and is determined by the feed-back filter and by an original data detected by the detector;
  an adder adding the values outputted from the plurality of branch metric calculating units;
  a path metric memory storing the added value;
  a minimum value calculating unit calculating a minimum value of the accumulated values; and
  a comparator comparing the minimum values and outputting a most minimum value, and
 wherein the plurality of branch metric calculating units comprise:
  a plurality of absolute value calculating units obtaining an absolute value of a difference between the subtracted signal and the reference signal;
  a demultiplexer demultiplexing the absolute value outputted from the plurality of absolute value calculating units; and
  an adding unit adding the demultiplexed value outputted from the demultiplexer and a path metric value prior to a one period of sampling time.

2. The equalizer of claim 1, wherein the feed-forward filter changes the sampled signal to a causal signal.

3. The equalizer of claim 1, wherein the feed-back filter removes an intersymbol interference of the causal signal.

4. The equalizer of claim 1, wherein the plurality of branch metric calculating units are sequentially delayed as deep as $\tau$ from '0', respectively.

5. A Fixed-Delay Tree Search with Decision Feedback (FDTS/DF) equalizer restoring a data signal passing through a channel, the FDTS/DF equalizer comprising:
 an equalizer making a sampled data signal to be a causal signal and removing an intersymbol interference of the causal signal; and
 a detector detecting an original data from the signal without the intersymbol interference by using absolute value calculation,
 wherein the detector comprises:
  a plurality of branch metric calculating units obtaining an error between the subtracted signal and a reference signal, wherein the reference signal is time-variant and is determined by a feed-back filter and by the original data detected by the detector;
  an adder adding the values outputted from the plurality of branch metric calculating units;
  a path metric memory storing the added value;
  a minimum value calculating unit calculating a minimum value of the accumulated values; and
  a comparator comparing the minimum values and outputting a most minimum value, and
 wherein the branch metric calculating units comprise:
  a plurality of absolute value calculating units obtaining an absolute value of a difference between the subtracted value and the reference signal;
  a demultiplexer demultiplexing the absolute value outputted from the plurality of absolute value calculating units; and an adding unit adding the demultiplexed value outputted from the demultiplexer and a path metric value prior to a one period of sampling time.

6. The equalizer of claim 5, wherein the plurality of branch metric calculating units are sequentially delayed as deep as τ from '0', respectively.

7. A data restoring method of a Fixed-Delay Tree Search with Decision Feedback (FDTS/DF) equalizer, said method comprising:
   subtracting signals respectively filtered by a feed-forward filter and a feed-back filter;
   computing an error through an absolute value calculation between the subtracted signal and a reference signal, wherein the reference signal is time-variant and is determined by the feed-back filter and by an original data detected by a detector;
   delaying the error as deep as τ and adding them;
   storing the added results;
   obtaining a minimum value of the stored error value and obtaining a path according to the minimum value;
   obtaining an absolute value of a difference between the subtracted signal and the reference signal;
   demultiplexing the absolute value; and
   adding the demultiplexed value and a path metric value prior to a one period of sampling time.

8. The method of claim 7, wherein, in the path obtaining step, only a branch metric containing a selected path is left while remaining branch metrics are discarded.

9. A Fixed-Delay Tree Search with a Decision Feedback (FDTS/DF) equalizer, comprising:
   a feed-forward filter receiving and filtering a sampled signal;
   a feed-back filter filtering a restored data;
   a subtractor disposed between the feed-forward and feed-back filters and obtaining a difference between signals respectively filtered by the feed-forward filter and the feed-back filter; and
   a plurality of absolute value calculating units disposed after the subtractor and obtaining an absolute value of the difference between the subtracted value and a reference signal, wherein the reference signal is time-variant and is determined by the feed-back filter and by an original data detected by a detector; and
   a demultiplexer demultiplexing the absolute value outputted from the absolute value calculating units; and
   an adding unit adding the demultiplexed value outputted from the demultiplexer and a path metric value prior to a one period of sampling time.

10. The equalizer of claim 9, further comprising:
    an adder adding the values outputted from the demultiplexer;
    a path metric memory storing the added value;
    a minimum value calculating unit calculating a minimum value of the accumulated values; and
    a comparator comparing the minimum values and outputting the most minimum value.

11. The equalizer of claim 9, wherein the feed-forward filter changes the sampled signal to a causal signal.

12. The equalizer of claim 9, wherein the feed-back filter removes an intersymbol interference of the causal signal.

13. The equalizer of claim 9, wherein the plurality of absolute value calculating units are sequentially delayed as deep as τ from '0', respectively.

* * * * *